United States Patent
Liu et al.

(10) Patent No.: US 11,773,983 B2
(45) Date of Patent: Oct. 3, 2023

(54) HIGH-PRESSURE SELF-SEALING BUTTERFLY VALVE

(71) Applicant: Dongbao Valve Co., Ltd., Wenzhou (CN)

(72) Inventors: Yu Liu, Wenzhou (CN); Jiawei Chu, Wenzhou (CN); Haizhang Zhang, Wenzhou (CN); Shize Gu, Wenzhou (CN); Jiangtao Liu, Wenzhou (CN); Yuanhui Luo, Wenzhou (CN); Yong Zhang, Wenzhou (CN); Weihui Zuo, Wenzhou (CN); Weiguang Shen, Wenzhou (CN)

(73) Assignee: Dongbao Valve Co., Ltd., Wenzhou (CN)

( * ) Notice: Subject to any disclaimer, the term of this patent is extended or adjusted under 35 U.S.C. 154(b) by 0 days.

(21) Appl. No.: 17/833,939

(22) Filed: Jun. 7, 2022

(65) Prior Publication Data
US 2023/0124873 A1    Apr. 20, 2023

(30) Foreign Application Priority Data
Oct. 16, 2021  (CN) .......................... 202111206493.0

(51) Int. Cl.
*F16K 1/226* (2006.01)
*F16K 1/46* (2006.01)

(52) U.S. Cl.
CPC .......... *F16K 1/2261* (2013.01); *F16K 1/2268* (2013.01); *F16K 1/46* (2013.01)

(58) Field of Classification Search
CPC ........ F16K 1/2261; F16K 1/2268; F16K 1/46; F16K 1/2285

USPC ................................. 251/305–308, 173, 175
See application file for complete search history.

(56) References Cited

U.S. PATENT DOCUMENTS

| | | | | |
|---|---|---|---|---|
| 1,671,069 A | * | 5/1928 | De Wein | F16K 1/22 251/305 |
| 1,860,619 A | * | 5/1932 | Pfau | F16K 1/2285 251/175 |
| 2,791,396 A | * | 5/1957 | Reppert | F16K 1/2285 251/306 |
| 2,911,184 A | * | 11/1959 | Moore | F16K 1/2285 251/173 |
| 3,008,685 A | * | 11/1961 | Rudden | F16K 1/228 251/175 |
| 3,260,496 A | * | 7/1966 | Borcherdt | F16K 31/1635 251/173 |

(Continued)

*Primary Examiner* — John Bastianelli
(74) *Attorney, Agent, or Firm* — Neugeboren O'Dowd PC

(57) ABSTRACT

A high-pressure self-sealing butterfly valve, which comprises a valve body and a valve shaft, wherein a flow channel and a butterfly plate are arranged in the valve body, a pure metal sealing ring and a pure metal valve seat are sequentially arranged at a portion, on the outer side of the butterfly plate, of the flow channel, a piston cavity is further formed in a flow direction end face of the pure metal valve seat, and an upper valve shaft and a lower valve shaft are arranged at the upper end and the lower end of the valve shaft respectively; an upper end cover assembly and an upper self-sealing assembly are arranged between the end part of the upper valve shaft and the valve body, a lower sealing bottom cover and a lower self-sealing assembly are arranged between the end part of the lower valve shaft and the valve body.

8 Claims, 2 Drawing Sheets

(56) References Cited

U.S. PATENT DOCUMENTS

| | | | | |
|---|---|---|---|---|
| 3,409,269 A | * | 11/1968 | Fawkes | F16K 1/2285 251/173 |
| 3,650,508 A | * | 3/1972 | Kosmala | F16K 5/0673 251/173 |
| 3,967,812 A | * | 7/1976 | Newell | F16K 1/2268 277/363 |
| 3,988,000 A | * | 10/1976 | Reese | F16K 1/2268 251/305 |
| 4,120,482 A | * | 10/1978 | Cox | F16K 1/2263 251/173 |
| 4,138,090 A | * | 2/1979 | Sumner | F16K 1/2285 251/173 |
| 4,192,484 A | * | 3/1980 | Scaramucci | F16K 1/2285 251/173 |
| 4,513,946 A | * | 4/1985 | Priese | F16K 1/2285 251/173 |
| 4,632,360 A | * | 12/1986 | DeSalve | F16K 1/228 251/173 |
| 4,773,625 A | * | 9/1988 | Calvin | F16K 1/2261 251/305 |
| 5,314,165 A | * | 5/1994 | Raymond, Jr. | F16K 1/2265 251/305 |
| 5,707,040 A | * | 1/1998 | Gasaway | F16K 1/2263 251/305 |
| 6,439,255 B1 | * | 8/2002 | Chamberlain | F16K 1/2285 137/15.25 |
| 2002/0134960 A1 | * | 9/2002 | Zwick | F16K 1/224 251/305 |

\* cited by examiner

HIGH-PRESSURE SELF-SEALING BUTTERFLY VALVE

CROSS REFERENCE TO RELATED APPLICATION

This patent application claims the benefit and priority of Chinese Patent Application No. 202111206493.0, filed on Oct. 16, 2021, the disclosure of which is incorporated by reference herein in its entirety as part of the present application.

FIELD OF THE DISCLOSURE

The present disclosure relates generally to valves. In particular, but not by way of limitation, the present disclosure relates to a high-pressure self-sealing butterfly valve.

BACKGROUND OF THE DISCLOSURE

Typical butterfly valves can withstand pressures less than or equal to a nominal pressure (PN) of 100 (600 LB). This limitation is primarily due to common structural features of typical butterfly valves, which are sealed using multi-layer sealing rings that are incapable of withstanding high pressure environments. Additionally, most butterfly valves utilize a valve shaft affixed to a valve plate, thereby necessitating a durable construction to withstand radial forces typically borne by the valve shaft in high-pressure environments. As such, when subjected to high pressures, leaks will form around a sealing between the valve rod and the valve body, indicating the butterfly valve is incapable of relying solely on bolt pressure of the pressing plate to maintain its seal.

Existing valve shaft sealing methods for butterfly valves are typically achieved by increasing the friction force between a packing and valve shaft by compressing the packing using a gland bolt. Such sealing methods have known defects such that when the valve is opened and closed, the packing is worn resulting in leakage. To prevent this, the packing gland needs to frequently be pre-tightened. While this solution assists in preventing the wearing down of the packing, the seal cannot be maintained while under high pressure due to the limited pre-tightening force, which results in potential safety hazards.

For these reasons, butterfly valves have typically only been produced and used in low-to-medium-pressure environments, even after many years of use and development. There is therefore a need in the art for a high-pressure butterfly valve that can overcome many of the shortcomings of typical butterfly valves when subjected to high-pressure environments.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Aspects disclosed herein address the above stated needs by disclosing a high-pressure self-sealing butterfly valve comprising: a valve body and a valve shaft; wherein a flow channel and a butterfly plate are arranged in the valve body; a pure metal sealing ring and a pure metal valve seat are sequentially arranged at a portion, on the outer side of the butterfly plate, of the flow channel, a piston cavity is further formed in a flow direction end face of the pure metal valve seat, and an upper valve shaft and a lower valve shaft are arranged at the upper end and the lower end of the valve shaft respectively; an upper end cover assembly and an upper sealing assembly are arranged between the end part of the upper valve shaft and the valve body, a lower sealing bottom cover and a lower sealing assembly are arranged between the end part of the lower valve shaft and the valve body, and the lower sealing bottom cover is fixedly connected to the lower valve shaft.

Further disclosed is a self-sealing boss is further arranged between the pure metal valve seat and the flow channel.

Further disclosed is a cavity opening is formed in a portion, on the pure metal valve seat, of the piston cavity, the piston cavity is provided with wide parts and narrow parts, and the width of each of the wide parts is greater than the width size of each of the narrow parts.

Further disclosed, the wide parts are arranged in the cavity opening of the piston cavity and a middle position of the piston cavity, and the narrow parts are arranged between the two wide parts and the cavity bottom of the piston cavity.

Further disclosed is the upper sealing assembly and the lower sealing assembly each comprise a sealing mandrel, a sealing packing, a sealing ring gasket, and a separate ring, wherein the sealing packing, the sealing ring gasket and the separate ring are all arranged on an outer sidewall of the sealing mandrel, and the sealing packing, the sealing ring gasket and the separate ring are sequentially arranged towards the axial end part of the sealing mandrel.

Further disclosed is the upper sealing assembly further comprises a separate ring locating pad, and the separate ring locating pad is arranged at the axial outer side of the separate ring.

Further disclosed, the outer side of the butterfly plate forms a mounting groove in a step-shaped structure, the pure metal sealing ring is arranged at the mounting groove, and the pure metal sealing ring is further arranged between the butterfly plate and the pure metal valve seat.

Further disclosed is the outer sidewall of the sealing mandrel is provided with a sealing cone for limiting and self-sealing.

Further disclosed is an inner diameter of the separate ring is equal to an inner diameter of the sealing ring gasket, and an outer diameter of the separate ring is greater than an outer diameter of the sealing ring gasket.

The high-pressure self-sealing butterfly valve of the present disclosure may be adopted using a valve seat of an existing butterfly seat, employing a multi-layer sealing ring and pre-tightening.

BRIEF DESCRIPTION OF THE DRAWINGS

The objects, features, and attendant advantages of the present disclosure are fully appreciated as the same becomes better understood when considered in conjunction with the accompanying drawings.

DETAILED DESCRIPTION OF THE EMBODIMENTS

Figure 1:
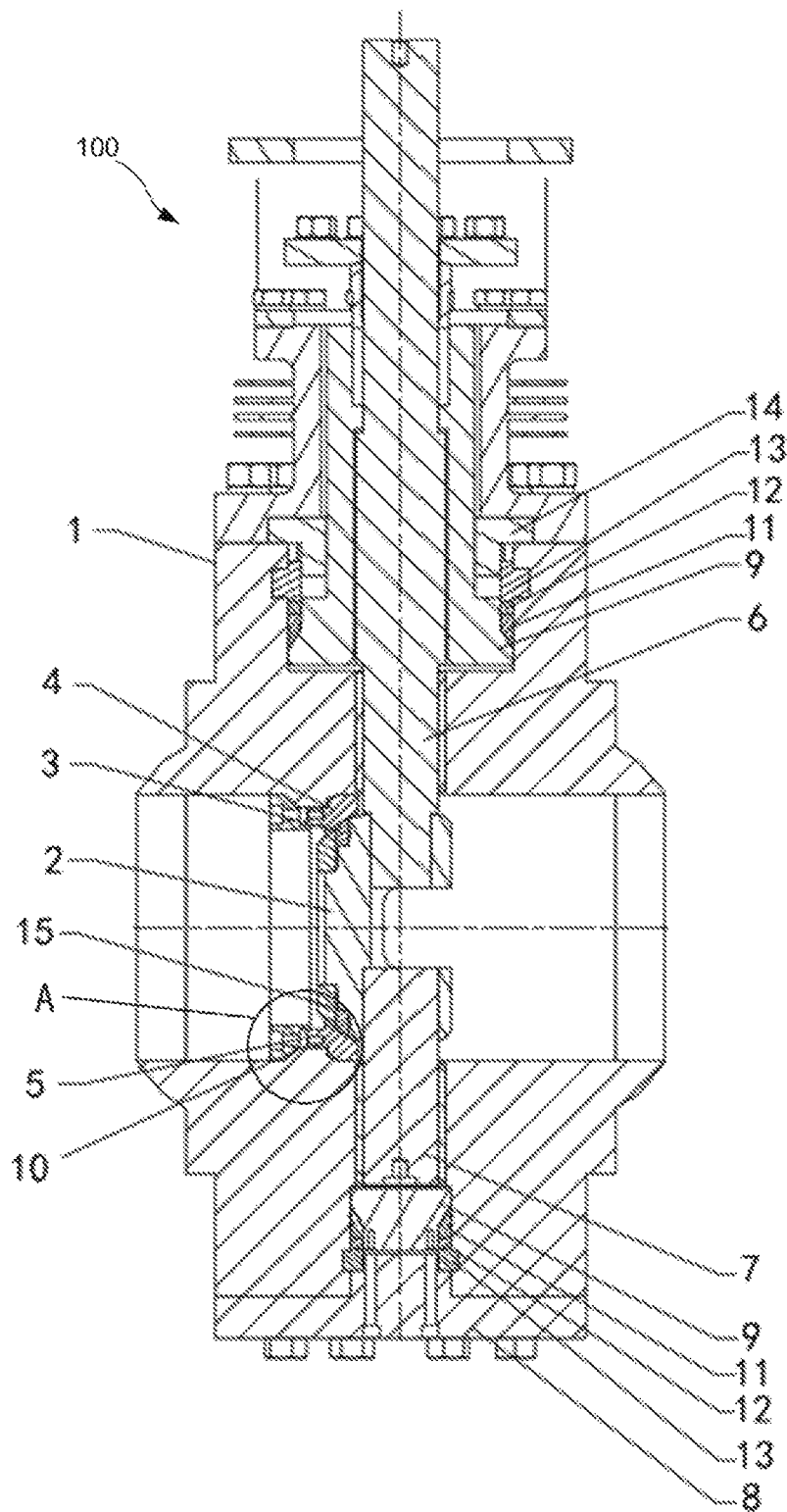
FIG. 1 is a schematic diagram of a structure of the present disclosure.
Figure 2:
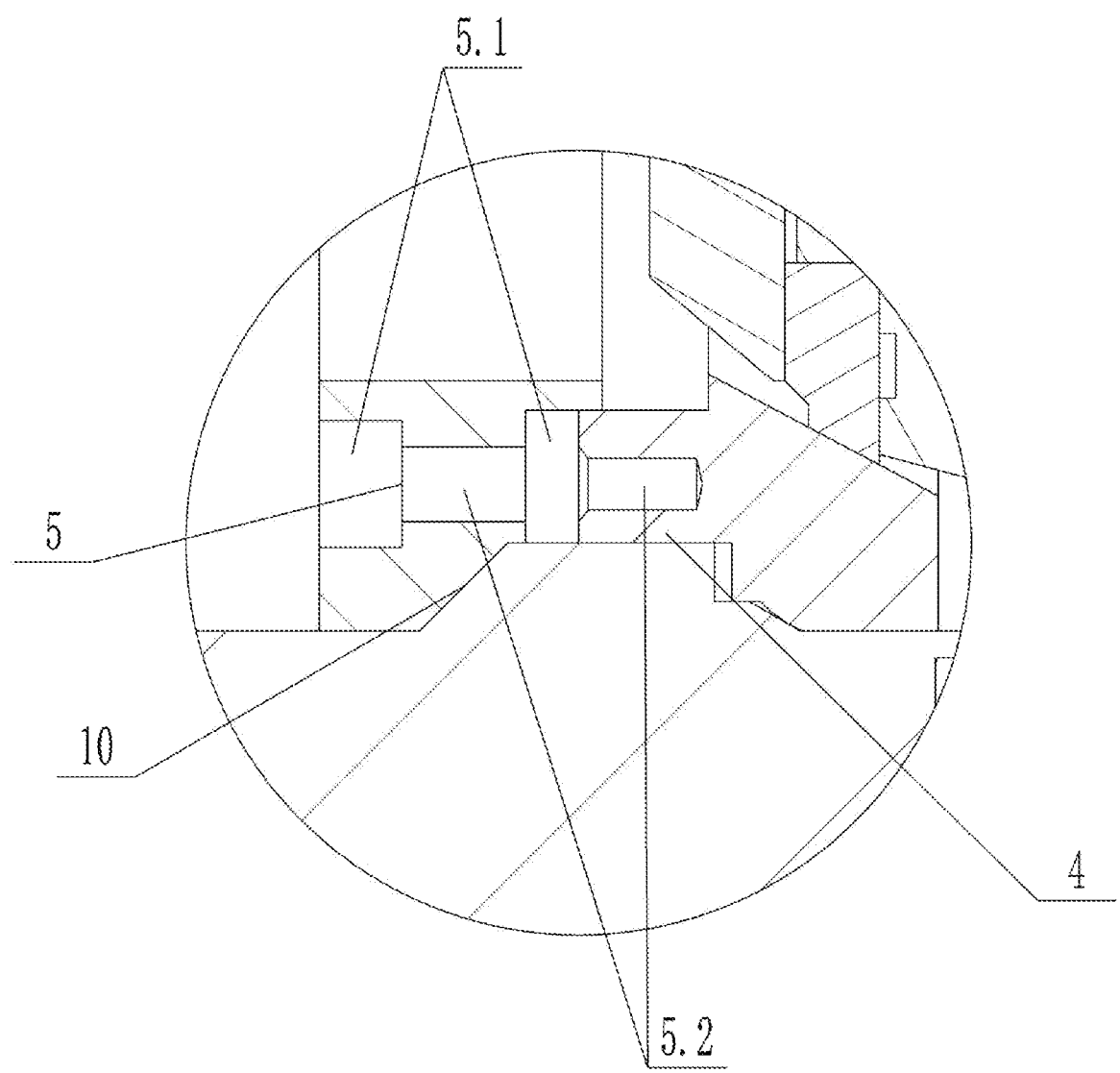
FIG. 2 is a partial enlarged diagram of detail A in FIG. 1.

The word "exemplary" is used herein to mean "serving as an example, instance, or illustration." Any embodiment described herein as "exemplary" is not necessarily to be construed as preferred or advantageous over other embodiments.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The present disclosure relates generally to valves. In particular, but not by way of limitation, the present disclosure relates to a high-pressure self-sealing butterfly valve.

Disclosed in detail below is a self-sealing butterfly valve comprising a pure metal valve seat and a sealing ring which enables the butterfly valve to withstand the thrust of the entire butterfly plate in a high-pressure environment. The butterfly valve may further comprise a three-eccentric center and adopt an elliptical sealing. This configuration is difficult to process, and the oval shape (ovality) is difficult to maintain. Few enterprises can design and manufacture a smooth multi-surface of a metal-to-metal sealing for tolerances of form and position of parts. Additionally, the shape of the butterfly plate and the area planning of the flow channel in the valve body are optimized, and the high-strength material is used as a valve rod material while the diameter of the valve rod is increased. The sealing strength between the valve rod and the valve body is increased to enable the butterfly valve to withstand the permeability of a medium under high pressure.

Shown in FIG. 1 is a high-pressure self-sealing butterfly valve 100 according to an embodiment of the present disclosure. The high-pressure self-sealing butterfly valve 100 may comprise a valve body 1, a valve shaft (6, 7), a flow channel, and a butterfly plate 2 within the valve body 1. A pure metal sealing ring 3 and a pure metal valve seat 4 may be sequentially arranged at an outer side of the butterfly plate 2, on a portion of the flow channel.

In some instances, a piston cavity 5 may be formed in a flow direction end face of the pure metal valve seat 4, a cavity opening may be formed on the pure metal valve seat 4, on a portion of the piston cavity 5, and the piston cavity 5 may comprise wide parts 5.1 and narrow parts 5.2. The width of each of the wide parts 5.1 may be greater than the width of each of the narrow parts 5.2. The wide parts 5.1 may be arranged at the cavity opening of the piston cavity 5 and centrally in the piston cavity 5. The narrow parts 5.2 may be arranged between at least two wide parts 5.1 and the bottom of the piston cavity 5. A medium may enter the piston cavity 5 to form a piston pushing structure to further strengthen the compaction of the pure metal valve seat 4 and enhance sealing. The design of the wide part 5.1 and the narrow part 5.2 may be conducive to forming a multi-layer thrust structure like branch-shaped internal extension for enhancing structural strength and balancing.

In some embodiments an upper valve shaft 6 and a lower valve shaft 7 may be arranged at opposite ends of the valve shaft (6, 7) (the upper end and the lower end) respectively. An upper end cover assembly and an upper sealing assembly may be arranged between the end part of the upper valve shaft 6 and the valve body 1. A lower sealing bottom cover 8 and a lower sealing assembly may be arranged between the end part of the lower valve shaft 7 and the valve body 1. The lower sealing bottom cover 8 may be connected to the lower valve shaft 7. The outer sidewall of a sealing mandrel 9 may comprise a sealing cone for limiting and self-sealing. The pressure in the valve may be continuously applied to the sealing packing, thus the self-tight sealing of the full life cycle of the valve may be achieved and the risk of leakage of the medium under high pressure is removed. The packing and gasket parts of the upper and lower valve seats of the butterfly valve may be designed to be self-sealing structures. The sealing cone of the sealing mandrel 9 can be hermetically attached to the sealing cone of a sealing packing 11 by pre-tightening of the sealing mandrel 9 during assembly thereby forming an initial sealing state. The sealing packing 11 may be compressed at a separate ring 13 by a sealing ring gasket 12. When the pressure on the medium rises, the sealing specific pressure among the sealing mandrel 9, the sealing packing 11 and the valve body 1 may gradually increased resulting in a self-sealing state and thereby ensuring no leakage of the medium.

Further shown is a self-sealing boss 10 according to an embodiment of the present disclosure. The self-sealing boss 10 may be positioned between the pure metal valve seat 4 and the flow channel. A labyrinth seal structure may be formed by the self-sealing boss 10 to further strengthen the sealing. The labyrinth sealing may accomplish the throttling or sealing effect even if a medium passes through a narrow and/or zigzag channel.

The upper sealing assembly and the lower sealing assembly each may comprise the sealing mandrel 9, the sealing packing 11, the sealing ring gasket 12, and the separate ring 13; wherein the sealing packing 11, the sealing ring gasket 12 and the separate ring 13 all may be arranged on an outer sidewall of the sealing mandrel 9. The sealing packing 11, the sealing ring gasket 12 and the separate ring 13 may be sequentially arranged at an axial end part of the sealing mandrel 9. An inner diameter of the separate ring 13 may be equal to an inner diameter of the sealing ring gasket 12. An outer diameter of the separate ring 13 may be greater than an outer diameter of the sealing ring gasket 12. Multiple seals and a zigzag medium channels may be used to further enhanced the seal.

In some embodiments multiple sealing structures or materials may be further compacted to improve the sealing as the pressure rises.

In other embodiments the upper sealing assembly may further comprise a separate ring locating pad 14. The separate ring locating pad 14 may be arranged at an axial outer side of the separate ring 13. The structure may differ from that of the lower valve shaft 7, thus the separate ring locating pad 14 may be utilized to facilitate mounting and sealing of the entire structure.

In yet other embodiments, the outer side of the butterfly plate 2 may form a mounting groove 15 in a step-shaped structure. The pure metal sealing ring 3 may be arranged at the mounting groove 15, and the pure metal sealing ring 3 may be further arranged between the butterfly plate 2 and the pure metal valve seat 4. The structure of the mounting groove 15 may be conducive to mounting and fixing of the pure metal sealing ring 3 and the pure metal valve seat 4. Finally, a labyrinth sealing structure may be formed in a matched mode to increase sealing adaptability in a high-pressure environment.

What is claimed is:

1. A high-pressure self-sealing butterfly valve, comprising:
    a valve body;
    a valve shaft;
    wherein a flow channel and a butterfly plate are positioned in the valve body;
    a sealing ring and a valve seat are sequentially arranged on an outer surface of the butterfly plate in the flow channel;
    wherein a piston cavity is formed in a flow direction end face of the valve seat, the piston cavity is configured for forming a piston pushing structure by a medium entering in the piston cavity;
    an upper valve shaft and a lower valve shaft are arranged at opposite ends of the valve shaft;
    an upper end cover assembly and an upper sealing assembly are disposed between the upper valve shaft and the valve body;
    a lower sealing bottom cover and a lower sealing assembly are disposed between the lower valve shaft and the valve body; and
    the lower sealing bottom cover is affixed to the lower valve shaft via a sealing mandrel.

2. The high-pressure self-sealing butterfly valve of claim 1, wherein a cavity opening is disposed on the valve seat in the piston cavity; and
    wherein the piston cavity comprising one or more wide parts and one or more narrow parts, wherein a width of each of the one or more wide parts is greater than the width of each of the one or more narrow parts along a direction perpendicular to an axial direction of the piston cavity.

3. The high-pressure self-sealing butterfly valve of claim 2, wherein at least one of the one or more wide parts is disposed at a cavity opening of the piston cavity and centrally in the piston cavity;
    wherein at least one of the one or more narrow parts is disposed between at least two of the one or more wide parts and a bottom of the piston cavity along a direction perpendicular to an axial direction of the piston cavity.

4. The high-pressure self-sealing butterfly valve of claim 1, wherein the upper sealing assembly and the lower sealing assembly each comprise the sealing mandrel, a sealing packing, a sealing ring gasket, and a separate ring; and
    wherein the sealing packing, the sealing ring gasket and the separate ring are arranged on an outer sidewall of the sealing mandrel;
    wherein the sealing packing, the sealing ring gasket and the separate ring are sequentially disposed towards an axial end of the sealing mandrel.

5. The high-pressure self-sealing butterfly valve of claim 3, wherein the upper sealing assembly further comprises a separate ring locating pad; and
    wherein the separate ring locating pad is disposed at an axial outer side of the separate ring.

6. The high-pressure self-sealing butterfly valve of claim 1, wherein an outer surface of the butterfly plate forms a mounting groove;
    wherein a sealing ring is positioned at the mounting groove and disposed between the butterfly plate and the valve seat.

7. The high-pressure self-sealing butterfly valve of claim 3, wherein the outer sidewall of the sealing mandrel comprises a sealing cone for limiting and self-sealing.

8. The high-pressure self-sealing butterfly valve of claim 5, wherein an inner diameter of the separate ring is equal to an inner diameter of the sealing ring gasket, and an outer diameter of the separate ring is greater than an outer diameter of the sealing ring gasket.

\* \* \* \* \*